United States Patent [19]
Feuerborn

[11] Patent Number: 5,704,861
[45] Date of Patent: Jan. 6, 1998

[54] SYNCHRONOUS DRIVE BELT/PULLEY COMBINATION

[75] Inventor: Frank Joseph Feuerborn, Lincoln, Nebr.

[73] Assignee: The Goodyear Tire & Rubber Company, Akron, Ohio

[21] Appl. No.: 708,007

[22] Filed: Aug. 28, 1996

[51] Int. Cl.⁶ .................................................. F16H 7/02
[52] U.S. Cl. ................................... 474/153; 474/205
[58] Field of Search .............................. 424/148, 152, 424/153, 202, 204, 205

[56] References Cited

U.S. PATENT DOCUMENTS

| | | | |
|---|---|---|---|
| 3,216,273 | 11/1965 | Colmer | 474/153 X |
| 3,575,474 | 4/1971 | Russ | 474/153 X |
| 4,494,946 | 1/1985 | Wilcox | 474/205 X |

*Primary Examiner*—Roger J. Schoeppel
*Attorney, Agent, or Firm*—Marc R. Dion, Sr.

[57] ABSTRACT

A synchronous drive belt/pulley combination wherein the lateral edges of the belt overhang the pulley.

1 Claim, 2 Drawing Sheets

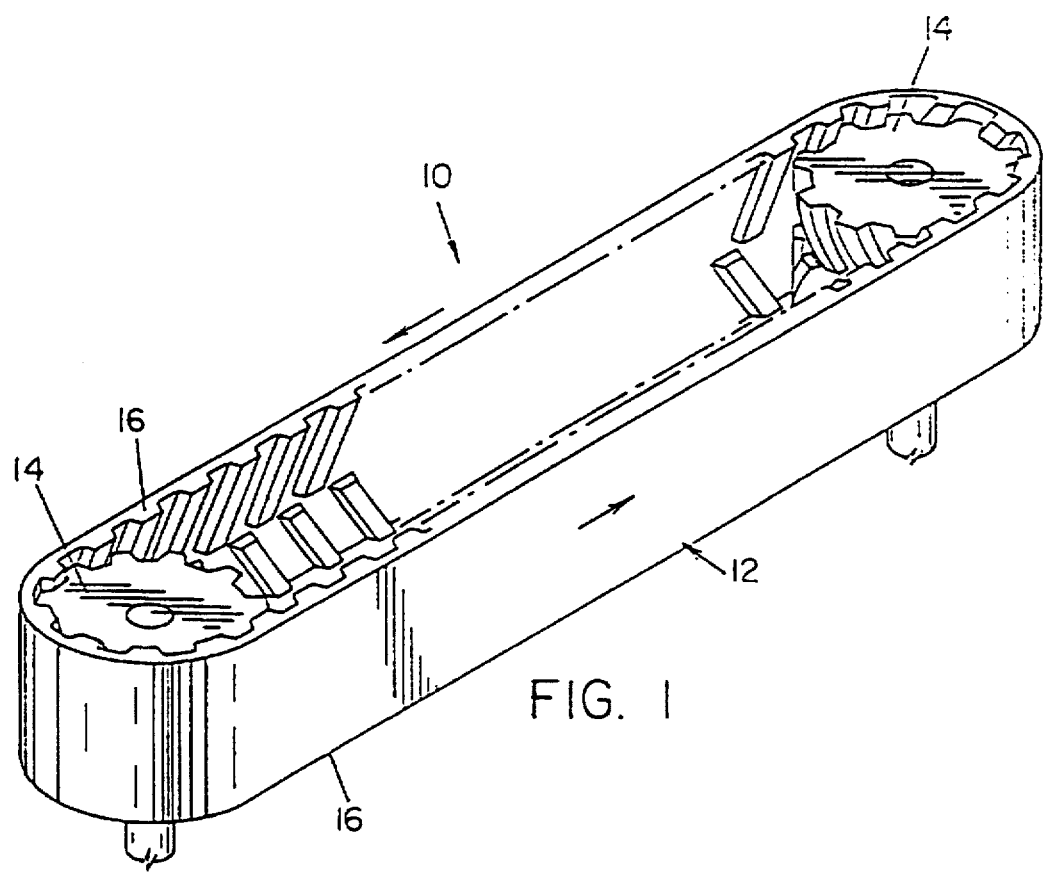
FIG. 1
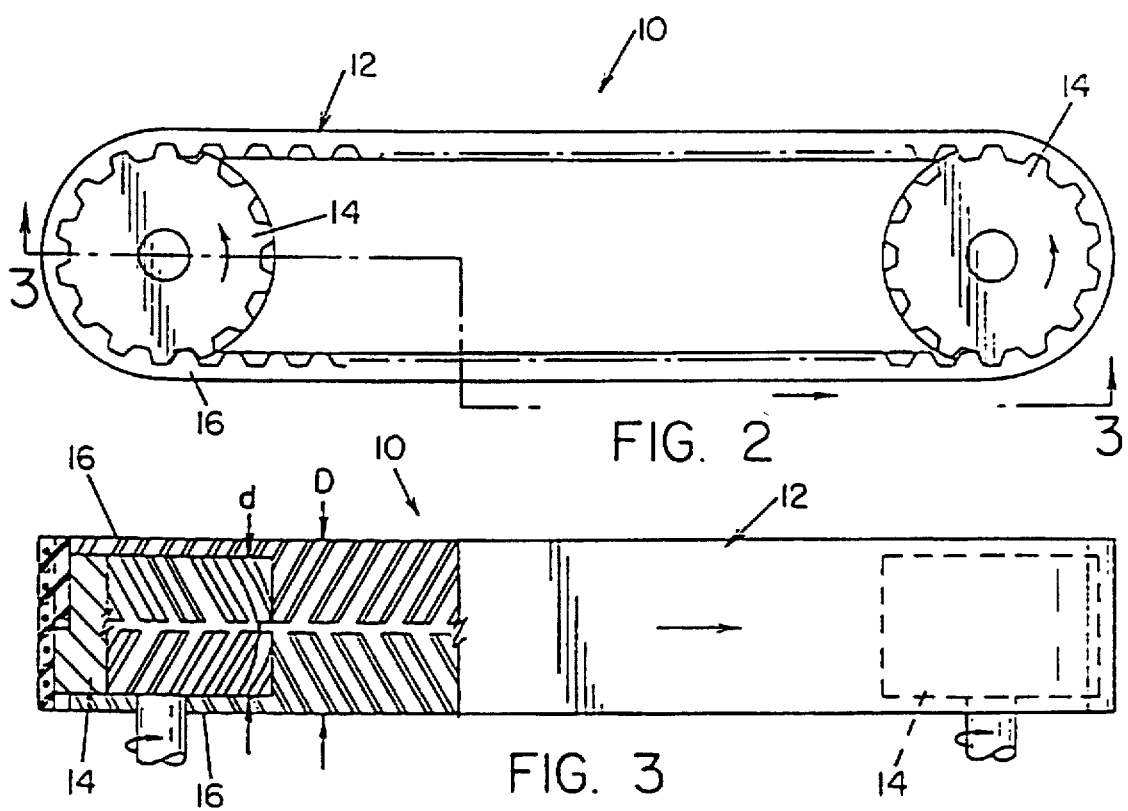
FIG. 2
FIG. 3

SYNCHRONOUS DRIVE BELT/PULLEY COMBINATION

FIELD

This invention relates to synchronous drive belts in combination with synchronous drive pulleys wherein the complementary teeth of the belt and cavities of the pulleys are such as to make the combination self-tracking.

BACKGROUND

Heretofore, synchronous drive systems are known to combine a toothed belt and a toothed pulley where the teeth run perpendicular to the longitudinal direction necessitating the use of flanges on the pulley or the belt to provide the tracking so that the combination remained meshed. More recently, various arrangements have been shown where the respective belt teeth and pulley cavities are oriented at angles in arrangements which are other than perpendicular. See e.g. U.S. Pat. No. 5,209,705 and the art cited therein. These arrangements allow for self-tracking of the belt/pulley combinations without the need for flanges on either the belt or the pulley. To that end, however, belt widths have remained less than or equal to the widths of the pulleys, subjecting the belts to tooth shear forces and tensile failures of the cords and cracking at the belt edges, and at the same time limiting the transmittable power per unit width of the sprocket.

SUMMARY OF THE INVENTION

In order to relieve tooth shear stresses and to increase the transmittable power per unit width of the sprocket, the present invention provides a combination of a self-tracking synchronous drive belt having lateral edges and an externally flangeless pulley having a width wherein the belt edges overhang the pulley. Such an arrangement allows for the full utilization of the full width of the pulley.

BRIEF DESCRIPTION OF THE DRAWINGS

FIG. 1 is a perspective view of the belt/pulley combination of the present invention.

FIG. 2 is a side elevational view of the combination.

FIG. 3 is a sectional view of the combination taken along line 3—3 of FIG. 2 with parts broken away.

DESCRIPTION OF THE INVENTION

Figure 4:
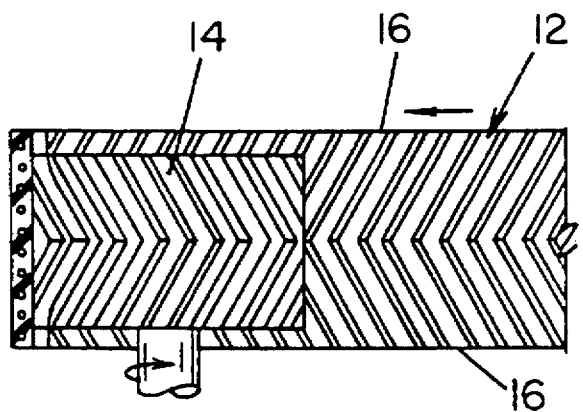
FIGS. 4–6 illustrate other typical tooth and cavity patterns of self-tracking belt/pulley combinations.
Figure 5:
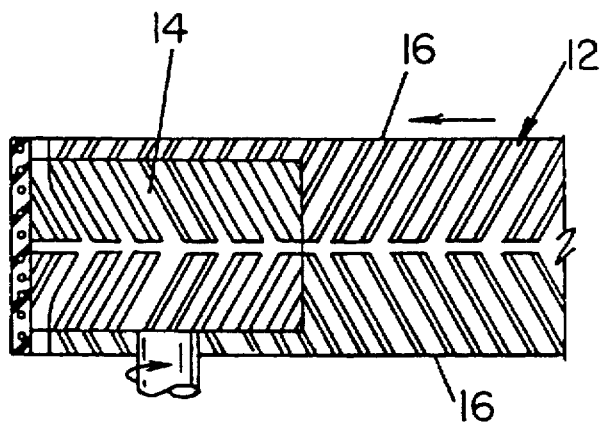
Figure 6:
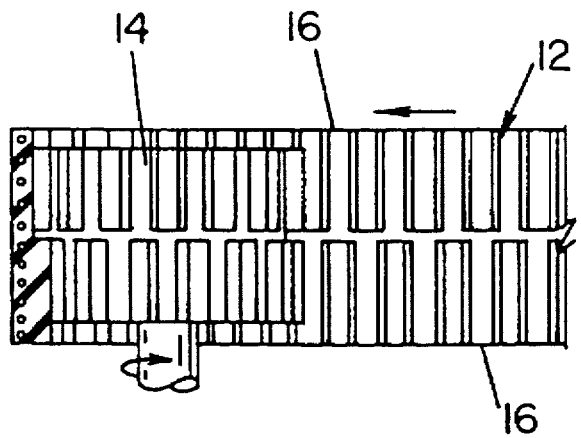

A belt/pulley combination, shown generally at 10, is comprised of a belt 12 and a pulley 14 wherein the belt teeth and the pulley cavities are complementary to each other in such a fashion as to make a self-tracking combination. The belt has two lateral edges 16 to define between them a belt width D. The pulley has a width d. The belt width D is made to be 101% to 200% the pulley width d. This combination allows for the use of a flangeless pulley, thus, reducing the weight while at the same time reducing the likelihood of shearing of the belt teeth due to the overhang.

While certain representative embodiments and details have been shown for the purpose of illustrating the invention, it will be apparent to those skilled in this art that various changes and modifications may be made therein without departing from the spirit or scope of the invention.

What is claimed is:

1. A combination of a self-tracking synchronous drive belt having lateral edges and an externally flangeless pulley having a width wherein the belt width between the lateral edges is from 101% to 200% the width of the pulley.

* * * * *